(12) United States Patent
Blatherwick et al.

(10) Patent No.: US 8,819,188 B2
(45) Date of Patent: Aug. 26, 2014

(54) CONFIGURATION OF IP TELEPHONY AND OTHER SYSTEMS

(75) Inventors: Peter Blatherwick, Ottawa (CA); Thomas A. Gray, Mansfield (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 347 days.

(21) Appl. No.: 11/774,352

(22) Filed: Jul. 6, 2007

(65) Prior Publication Data

US 2009/0013032 A1 Jan. 8, 2009

(51) Int. Cl.
*G06F 15/177* (2006.01)

(52) U.S. Cl.
USPC .......................................... 709/220; 709/222

(58) Field of Classification Search
USPC .......................................... 709/220, 221, 222
See application file for complete search history.

(56) References Cited

U.S. PATENT DOCUMENTS

| | | | |
|---|---|---|---|
| 6,314,088 B1 | 11/2001 | Yamano | |
| 6,856,616 B1* | 2/2005 | Schuster et al. | 370/352 |
| 6,934,530 B2* | 8/2005 | Engelhart | 455/406 |
| 7,194,069 B1* | 3/2007 | Jones et al. | 379/88.02 |
| 2002/0126654 A1* | 9/2002 | Preston et al. | 370/352 |
| 2003/0070063 A1 | 4/2003 | Boyle et al. | |
| 2004/0162818 A1 | 8/2004 | Shaw | |
| 2005/0031108 A1 | 2/2005 | Eshun et al. | |
| 2005/0213567 A1* | 9/2005 | Mullins et al. | 370/352 |
| 2006/0268829 A1* | 11/2006 | Nedeltchev | 370/352 |
| 2008/0059782 A1* | 3/2008 | Kruse et al. | 713/1 |
| 2008/0235768 A1* | 9/2008 | Walter et al. | 726/3 |
| 2009/0013062 A1 | 1/2009 | Blatherwick | |
| 2011/0070877 A1* | 3/2011 | Macaluso | 455/419 |

OTHER PUBLICATIONS

D. Petrie; A Framework for Session Initiation Protocol User Agent Profile Delivery (Internet draft) Nov. 2, 2007.
J. Rosenberg et al.; Simple Traversal of User Datagram Protocol Through Network Address Translators (Internet Official Protocol Standards) Mar. 2003.
Petrie Sipez LLC S Channabasappa D et al: "A Framework for Session Initiation Protocol User Agent Profile Delivery; . . . 12.txt" May 1, 2007; XP015051700 ISSN:0000-0004.
Open Mobile Alliance: "OMA Device Management Requirements Approved Version 1.2 OMA-RD-DM-V1_2-20070209-A" Feb. 9, 2007 pp. 1-62; XP002525500.

\* cited by examiner

*Primary Examiner* — Mohamed Ibrahim

(57) ABSTRACT

A method for configuring a network device includes connecting the device to a LAN that is connected to a WAN and detecting that the device has not been configured. Accessing within the device a pre-defined address of a configuration server located on the WAN and sending a configuration request for a service to the configuration server. The request includes a network identifier locating the device on the LAN. Receiving the request at the configuration server and preparing a configuration profile for the device. The configuration profile includes i) a service address for the device, and ii) a wide area network address for a service provider that will provide the service. The method also includes sending the profile to the device from the configuration server, and activating the profile in the device such that the device is configured to access the service via the service provider.

50 Claims, 2 Drawing Sheets

CONFIGURATION OF IP TELEPHONY AND OTHER SYSTEMS

FIELD

The present specification relates generally to computing devices and more specifically relates to the configuration of end-user devices such as telecommunications devices, Internet Protocol ("IP") telephony devices and other systems.

BACKGROUND

Those skilled in the art of IP telephony are well aware that "The Session Initiation Protocol (SIP) is an application-layer control (signaling) protocol for creating, modifying, and terminating sessions with one or more participants. These sessions include Internet telephone calls, multimedia distribution, and multimedia conferences," (See Request for Comments: 3261 (RFC 3261 at http://tools.ietf.org/html/rfc3261) from the Internet Engineering Task Force ("IETF") www.ietf.org) SIP can provide a signaling and call setup protocol for IP-based communications able to support at least some of the call processing functions and features of the public switched telephone network ("PSTN") as well as many advanced Web-based features.

Much work has been done on SIP since RFC 3261. See for example the Internet-draft entitled *A Framework for Session Initiation Protocol User Agent Profile Delivery* at http://tools.ietf.org/html/draft-ietf-sipping-config-framework-12 by Petrie et al. ("Petrie"). Petrie describes configuration scenarios for a number of important system architectures (See for example "Simple Deployment Scenario" Section 4.1 of Petrie and "Device supporting multiple users from different Service Providers" Section 4.2 of Petrie). These scenarios are all addressed from the viewpoint and necessary relationships for the end point being configured and simplifying assumptions are made regarding availability of configured network elements to assist in the process.

There are many shortcomings to Petrie for at least some applications and environments. Petrie does not discuss necessary relationships between the configuration servers shown in FIG. 1 of Petrie and the business entities supplying them. Importantly, Petrie: a) assumes specifically configured network infrastructure in the user's location for the end-user devices (end points) to become configured, b) assumes a prior relationship between the user's network or that of their access provider and either the device provider (i.e. the device vendor) or the service provider (i.e. the provider of the voice or other media communication service), and c) does not allow for end points to be directed to one of many possible service providers based on devices manufactured or distributed by a single device vendor.

Petrie is also not generally suitable for configuration of a Voice over IP ("voIP") network in a residential or small business establishment, and is not readily applicable to remote and branch office, as well as teleworking scenarios in a larger enterprise. Petrie assumes that the local network is managed by trained personnel, which is something that cannot be assumed for the home or small office market, nor can it be assumed in smaller branch offices of a larger enterprise.

Petrie describes three sources of configuration information as shown in FIG. 1 of Petrie. The SIP Service Provider supplies information (feature subscriptions etc) that is specific to the individual user. The Device Provider provides information that is specific to the device. The Local Network Provider provides information that guides the device in the use of the local network. Petrie assumes that the local network is owned by the provider of this information and will set constraints on its use (e.g. bandwidth limitations on a local WiFi hot spot in a coffee shop).

Section 5.1.1.1 of Petrie describes in considerable detail how the device will obtain the required local network configuration profile. This will be obtained from a local Dynamic Host Configuration Protocol ("DHCP") server or through the use of a locally relevant Domain Name Service ("DNS"), The local DHCP and DNS server in Petrie will, in practice, need to be updated by trained personnel. No such personnel can be assumed to exist in the small business, home or small branch office markets.

Section 5.1.1.2 and its subsections of Petrie describe similar processes for obtaining a device configuration profile. Again, assumptions are made regarding the availability of configured network resources to assist in this process that are invalid for small unmanaged network environments or impose significant deployment constraints on their applicability. In the case of device profiles, multiple possible methods are described in Petrie.

In the first method, service provider or device manufacturer pre-configured information is used to locate the device profile server, which is functional, however presumes a pre-existing relationship between the device manufacturer and service provider in order to bring the device fully into service. No such relationship may exist, or multiple such relationships may exist (one device provider to many possible service providers, or many device providers to one service provider), either of which is ambiguous, hence final configuration cannot be immediately completed.

In a second method, it is assumed that a device profile can be located using the local network domain (supplied by DHCP) to locate the device profile server, i.e. the device profile server is in the provided local domain. Either in the local network or in the access network (e.g. the Internet Service Provide ("ISP")), both DHCP and DNS servers would need to be configured to provide correct information for the location of the device profile server. This assumes there is a pre-existing relationship either between the local network administrator and the entity that manages the device profile server (likely the local network is effectively unmanaged in a small network environment), or there is a relationship between the user's access network (e.g. ISP) and that entity—no such relationships can be assumed (i.e. the network access and device maintainer are not in general related to each other in any way).

The third method is manual configuration, which implies some level of user knowledge and interaction, and is not auto-configuration at all.

In general, Petrie is not adequate for the small business and home systems of interest to this disclosure, and is also not readily applicable to a wide range of branch office and teleworking scenarios in larger enterprises. Petrie assumes that the local network will be of some sophistication. Petrie assumes that the local network has been configured with a domain identifier for example. Petrie assumes that the local DHCP server has been set up to contain this information. Pertinent to this is the implicit assumption that there are personnel responsible for the site that have the skills to set up a DHCP and/or DNS servers in specifically required ways.

Petrie also assumes a pre-existing relationship between local network and the entity which maintains the device profile server, or between the user's access network and that entity. While sometimes viable (e.g. the ISP is also the device maintainer and the voice service provider), these assumptions are not true in the general case (all three entities may be unrelated). Even if such relationships could be set up, they would grow extremely complex and onerous over time, due to the highly distributed, global, and ever changing nature of Internet-based systems.

Further to this, Petrie assumes that the local network is supplied with a SIP proxy server which is able to handle issues with firewall and Network Address Translation ("NAT") in order to make contact with outside SIP facilities. This will also not be true in the general case, particularly in home and small business environments.

In the home and small business situation, none of these assumptions are necessarily valid. The operative assumption is that a naïve user will buy a device (SIP telephone etc.) at a consumer-level store (e.g. big box electronics outlet), or be shipped a generic device by a service provider or device provider, take it home or to the small business, and plug it into their own network. They will expect the device to function as intended without delay and without any training that cannot be obtained from a brief instruction sheet. Any requirement that the user possess or obtain specialized skills will make these devices commercially unattractive.

In addition to the requirements on the local network, Petrie is silent on how the location of the SIP Service provider configuration server is found. It is assumed that this is somehow configured.

A problem addressed by Peterie is the configuration of SIP User Agents (UA) (devices such as IP telephones, softphone clients on PCs etc), Petrie envisages this to be taking place on the LAN within a business or other institution, in residential small networks, or in public "hotspots" and similar. When these devices are first installed, they must be supplied with some initial configuration information. This can include (not limited to): An updated software load; Initial configuration of soft keys and other optional controls and displays and importantly for this disclosure, the location of the SIP proxy server. Petrie calls this the Discovery and Enrollment phases. The UAs will receive most of their configuration information by use of SIP Subscribe/Notify interactions with the configuration server shown FIG. 1 of the Petrie draft. The Petrie Draft recommends that this server be given the well-known SIP user id of "_sipuaconfig". They will issue Subscribe messages for their desired configuration and receive them by the corresponding Notification.

This interaction requires that the UAs be aware of the address and port of the Configuration Server. Petrie describes several possible methods including manual loading. However, the method that Petrie foresees as being most commonly used is that of DHCP. DHCP is commonly used to provide UAs with the address of the SIP Proxy server (logically different from and not necessarily the same as the desired configuration server). The port number used on the Proxy server may be added to the DHCP server as an optional extension. With the address of the proxy server, the port number and the well-known user id of the configuration server, the configuration server's SIP URI can be constructed. A similar alternate to this uses DNS lookup, based on DHCP-supplied "local domain", to attempt to locate the desired configuration server in the local domain. With this information the UAs can attempt to interact with the Configuration Server.

The Petrie solution is characterized by:
  Taking place in the LAN environment (behind the firewall and/or NAT) of a single enterprise or institution, or in some other managed environment,
  The local network is prepared for its operation in that the DHCP and DNS servers are configured to supply the proper information and that a configuration server is supplied and properly registered with the locally known SIP proxy.
  There are trained personnel servicing the network. For example, to update the DHCP server with the optional extension including the port address of the Proxy server and/or DNS entries for the configuration server, and to ensure the configuration server is known to the Proxy server.
  The devices on the LAN have been configured by a single entity (a single vendor such as the local system manager, a value-added reseller or a manufacturer) and as such are adapted to work together.
  If the configuration server is in a foreign network (not the same as the local network), information for the configuration server can be known to the local administration, and can be configured successfully in the local network, or is configured in the access network to which the local network is connected. This assumes a prior arrangement between the local or access network and the network(s) hosting the configuration servers.

There are several drawbacks and limitations to this approach, as discussed above and there are other drawbacks and limitations that will now occur to those skilled in the art.

Current VoIP service providers such as Vonage or Skype use proprietary devices. Vonage supplies a specific piece of hardware that connects standard telephones to its VoIP network, Skype supplies a software client that operates on standard personal computers. However these solutions are operable on only the networks supplied by these providers. The systems are self-configuring because of this limitation. One deficiency of these systems is that users cannot buy equipment from a provider of their choice and attach it to these networks,

SUMMARY

This specification describes the dynamic configuration of SIP end points although there is nothing in the specification that precludes the same techniques from being used for the configuration of other types of devices or using other network technologies.

This specification discusses a system architecture that Petrie does not discuss and necessary relationships between the configuration servers shown in FIG. 1 of Petrie and the business entities supplying them. Importantly, the present specification does not assume configured network infrastructure in the users location to become configured, does not assume any prior relationship between the user's network or their access provider and either the device provider or the service provider, and allows for end points to be directed to one of many possible service providers based on devices manufactured or distributed by a single device vendor.

This specification describes the configuration of a VoIP network in a residential or small business establishment, and is also readily applicable to remote and branch office, as well as teleworking scenarios in a larger enterprise.

The same techniques described here may also be readily applicable to a wide range of larger enterprise market, wishing to reduce their administrative overhead or use a hosted VoIP service rather than a service they maintain themselves.

Although the emphasis in this specification is on the small business and home market, the teaching herein can also be useful for branch office and teleworker applications in large enterprise applications. Devices can be configured on local networks in branch office and home locations that are not normally serviced by trained personnel from these large enterprises. The devices can be directed to connect to the enterprise network in the same manner as described for the connection to the service provider networks for small business and home applications. The business relationships for this case will be between the owning large enterprise and the device supplier. The device supplier may be the device manufacture or a representative, or may be an organization within the enterprise. They will be directly analogous to the business relationships described between the device provider and service provider. Server interactions can be the same in both cases.

The present specification describes how SIP telephones and other devices can be configured on local networks by nave users, without specific network preparation. A user will buy a generic device at a general-purpose store, or alternatively have it shipped to them. The device will come from a vendor and a retailer neither of which may have any obvious relationship with the SIP service provider. This specification describes a business relationship and methods that will allow the device to access the desired service provider user and device profile configuration server(s) without requiring onerous tasks on the part of the user.

This specification can address the issue of the configuration of service for a residential or small business environment in which there is no possibility of preparing the network, In particular, no trained personnel are available who can set up a local DHCP or DNS servers to allow for the configuration of SIP devices in connection with external device configuration services such as the device vendor or representative and/or service provider service plans. This specification describes business relationships between device providers and service providers that will enable methods by which device configuration can be done automatically with as little user intervention as possible. The specification extends the standard SIP configuration as described in Petrie.

This specification envisages a local SIP network set up by peer to peer methods. Taken in conjunction with Petrie, this vision raises a "chicken and egg" scenario: How can a SIP proxy be elected before it is configured? The methods describes in this specification can address the "chicken and egg" scenario and can allow the creation of peer to peer SIP systems on previously unprepared local networks.

DETAILED DESCRIPTION OF THE EMBODIMENTS

Figure 1:
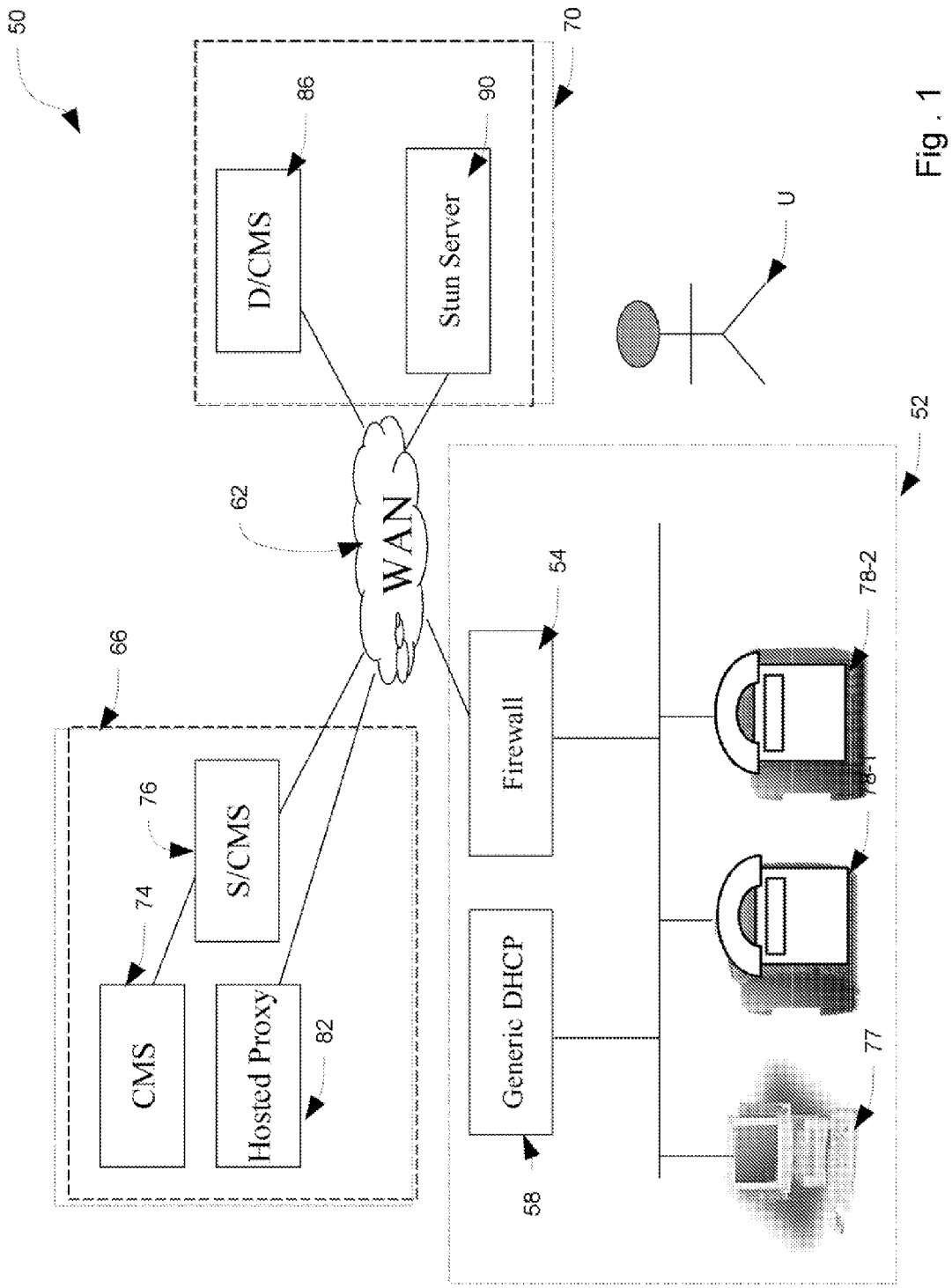
FIG. 1 is a schematic representation of a configurable IP telephony system in accordance with an embodiment.

Referring now to FIG. 1, a configurable IP telephony system in accordance with an embodiment is indicated generally at 50. System 50 includes a network 52 such as a small business computing network or a home computing network. Network 52 is generally serviced by a generic firewall/NAT 54 and a DHCP server 58. Firewall/NAT 54 is in turn connected to a wide area network (WAN) 62 such as the Internet or a larger enterprise network. WAN 62 provides a point of interconnection for various network components from a service provider 66 and a device provider 70.

Network 52 comprises a plurality of devices that connect thereto, which in a present embodiment comprise at least one computer 77 and at least one IP telephone 78-1, 78-2 (Collectively IP telephones 78 and generically IP telephone 78). Computer 77 and IP telephones 78 connect to WAN 62 via DHCP 58 and firewall 54, and accordingly, computer 77 and telephones 78 are able to interact with hardware connected to WAN 62 including hardware associated with service provider 66 and device provider 70.

Service provider 66 acts as the service provider for network 52 and includes all of the appropriate necessary and/or infrastructure therefor, including, but not limited to a configuration management server ("CMS") 74 which connects to WAN 62 through a Service Provider CMS ("S/CMS") 76. Service provider 66 also includes a hosted proxy 82 that connects directly to WAN 62.

Device provider 70 assists in the provisioning of IP telephones 78 as they are connected to network 52, and includes a Device Configuration Management Server 86 ("D/CMS") and a STUN server 90 both of which connect directly to WAN 62. The structure and function of STUN server 90 can be understood by reference to Request for Comments 3489 ("RFC 3489"), entitled *Simple Traversal of User Datagram Protocol (UDP) Through Network Address Translators (NATs)* found at http://www.ietf.org/rfc/rfc3489.txt and by further review of the teachings herein.

Figure 2:
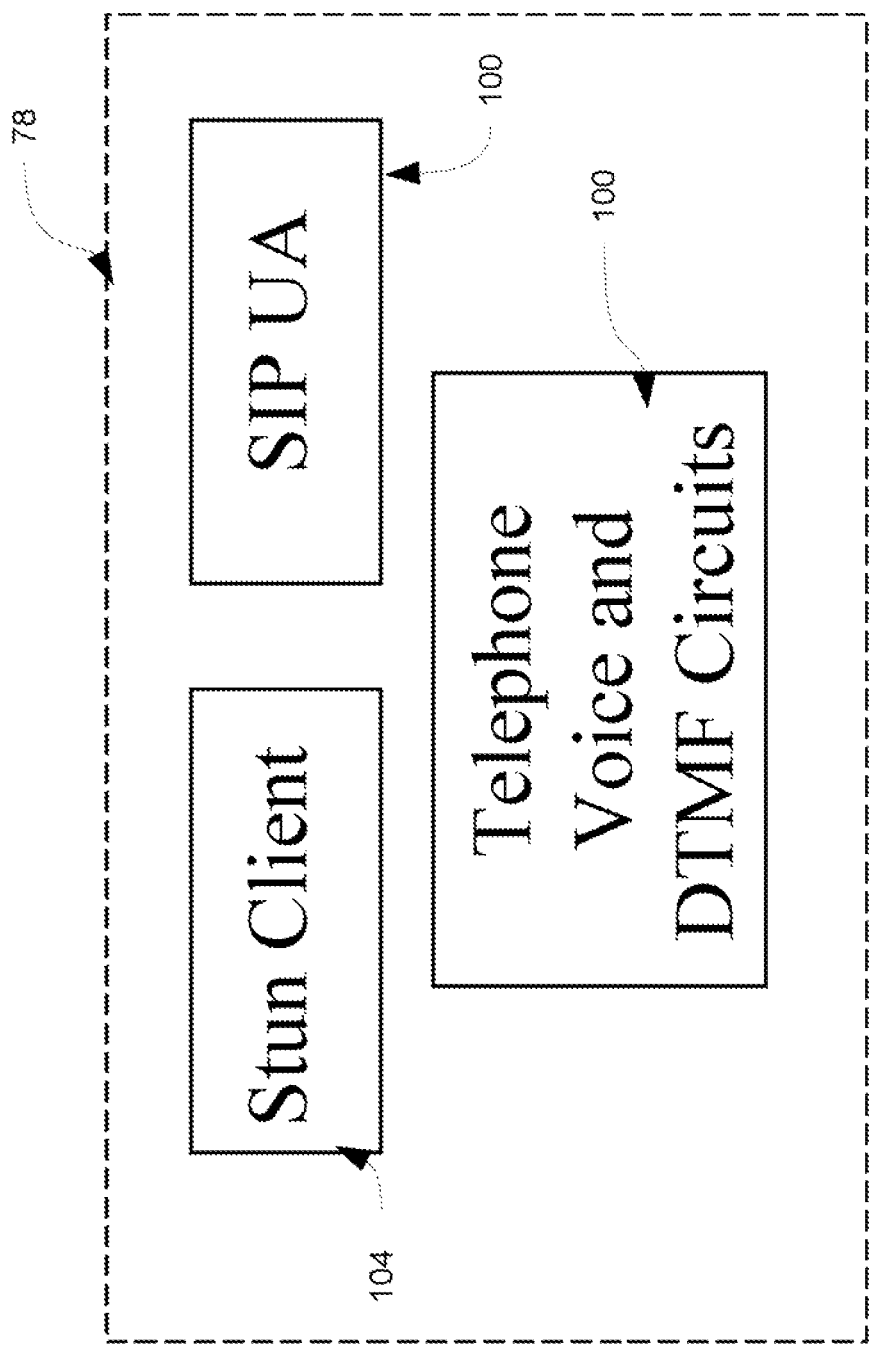
FIG. 2 is a schematic representation of an IP telephone from the system of FIG. 1.

A user U is associated with network 52. User U, it is assumed, is not capable of customizing the operation of either the DHCP server 58 or the firewall/NAT 54 or in preparing network 52 in any significant way. It is assumed that user U has purchased a device, such as telephone 78-2 at a consumer electronics store, or possibly it has been shipped to them by some means. It is assumed that user U intends to connect telephone 78-2 to network 52 and expects to be able to make telephone calls using telephone 78-2. As shown in FIG. 2, telephone 78 contains among other things a SIP user agent (UA) 100 and a STUN client 104. (Again, see RFC3489 where STUN is discussed as a protocol that is intended to deal with the issues of NAT traversal for SIP and other protocols.) Telephone 78 also includes a standard suite of telephony circuits to manage voice and/or dual-tone-multi-frequency ("DTMF") tones and the like.

It should be noted that the teachings herein are not limited to telephone 78 and that there can be a wide variety devices that can be purchased with SIP capability. (Indeed, the teachings herein are also applicable to computer 77 which can run software to emulate telephone 78). At a minimum, telephones can range from simple telephone sets to larger telephone handsets with large display and full keyboards. These varying capabilities affect the methods whereby configuration data can be obtained or entered by the user. However, as a minimum, these telephone are able to make voice telephone calls and will contain some method of DTMF signaling (keyboard or otherwise). For this specification, the minimum device capability will be assumed.

At this point it is to be clarified that the present teachings reflect a specific embodiment, SIP is a non-limiting example of a protocol—the protocol does not need to be SIP, it is just a current example used in the present embodiment. Further, the device does not need to be telephone 78, the device can be any device that needs auto-configuration by untrained users and which communicates across a WAN such as the Internet (e.g. VoIP Gateway, Media Server, IVR, network game device, entertainment device such as IPTV, medical monitoring, security systems and the like).

For purposes of configuration, the manufacturer of telephone 78 will have equipped telephone 78 with a bootstrap program that will function automatically as much as possible. Telephone 78 will also be supplied with a unique identifier (device id). This could be, for example, its Institute of Electrical and Electronic Engineers ("IEEE") 802 Media Access Control address ("MAC") address or the like.

When telephone 78 is first powered up and connected on local area network associated with network 52, telephone 78 will detect that it has not been configured. To support configuration, the manufacturer (which may or may not be device provider 70 itself of telephone 78 has equipped telephone 78 with a bootstrap program and has pre-configured the addresses on WAN 62 (e.g. Uniform Resource Identifier ("URI")) for D/CMS 86 and, optionally, STUN server 90. (Of note, STUN server 90 is only needed to support configuration scenarios where NAT devices are imposed—if the device is already using a routable IP address directly, the STUN client and server are unnecessary). On power up, telephone 78 will have been supplied a locally significant UP address from a generic DHCP server 58 in the standard well-known way. The bootstrap program will use this local IP address with STUN client 104 to contact STUN server 90 and obtain the globally significant IP address and port that is being supplied to it by Firewall/NAT 54. The bootstrap program will then combine the device id of telephone 78 with the supplied NAT address and port to form an effective SIP URI unique to telephone 78. It will use this SIP URI as its SIP FROM and CONTACT addresses to issue a SUBCRIBE message to the D/CMS server 86 for the current device configuration files. This SUBSCRIBE request will be addressed to the pre-configured D/MCS 86 URI, using the SIP To: field, and can be sent directly to the D/CMS 86, possibly via DNS lookup. Optionally, the URI of D/CMS 86 may correspond to an inbound SIP Proxy server in the device provider's network (not shown) to which SIP signaling (Subscribe/Notify, SIP calls etc) from telephone 78 can be directed and routed via normal SIP processing once in that destination network.

The D/CMS 86 can be configured to ascertain the required configuration files respective to telephone 78 by linking the device id of telephone 78 to the model type and appropriate revision. D/CMS 86 can then supply the required configuration files in a responding Notification message back to the telephone 78. The subscription can remain open and any updates to telephone 78 configuration can be supplied in subsequent Notification messages.

Device provider 70 of telephone 78 can optionally supply telephone 78 with necessary information about a subscription available from service provider 66 depending on the business relationship between the vendor of telephone 78 and service provider 66. There are several cases.

A) No Business Relationship

This case is similar to the scenario described in Petrie. In this case device provider 70 can offer no help and service provider 66 will supply instructions to the user as to how to contact S/CMS 76.

B) Pre-Arranged Device Registration i) Location Pre-Configuration

A relationship can be established so that the vendor (not shown) of telephone 78 and service provider 66 have previously arranged to have telephone 78 sold in association with a particular offering from service provider 66. For example, telephone 78 can be sold in service provider packaging with an associated plan.

In this type of situation device provider 70 can supply the required addresses of the S/CMS 76 as part of pre-configuration of telephone 78. In this situation, telephone 78 will contact S/CMS 76 in the same way that telephone 78 connected the D/CMS 86 and receive any necessary information, Such pre-configuration can be done at time of manufacture, as a preshipping configuration step, or as some other post-manufacturing process.

Either the device provider 70 or service provider 66 can then arrange so that telephones such as telephone 78 are provided to user U (and or other users like user U with networks like network 52) that are specifically pre-configured with the address of S/CMS 76 corresponding to specific service provider 66, possibly through store visit from the customer or by direct shipping.

Alternatively, the D/CMS 86 can fulfill the role of the S/CMS 76 and directly supply the configuration files to telephone 78 corresponding to those that otherwise would have been supplied by service provider 66. D/CMS 86 can then have been configured to hold the required configuration information for service provider 66. As a further alternative, D/CMS 86 can act as a relay between telephone 78 and S/CMS 76. In both of these cases, the same configuration as previously-discussed can be used, with the exception that the location of the D/CMS server 86 is configured instead of S/CMS 76 associated with service provider 66.

C) Pre-Registered Telephone IDs

As an alternative to placing the address of S/CMS 76 in the pre-configuration files of telephone 78, device provider 70 and service provider 66 can pre-register the device id of each telephone 78 that is to be used in a service offering. Either device provider 70 or service provider 66 then arranges to provide user U (and other users like user U) with telephones 78 that are specifically pre-configured with one of these previously known device ids, corresponding to the specific service plan and user U, possibly through store visit from the customer or by direct shipping.

Such pre-registration can be done in blocks or as groups of individual device ids. When telephone 78 contacts D/CMS 86, the device id of telephone 78 can indicate the service provider and service offering that is to be supplied. As in the previous example, D/CMS 86 can either supply the location of the S/CMS 76 to telephone 78 or perform the function of accessing of S/CMS 76 itself depending on the relationship between the device provider 70 and service provider 66. In the former case, the URI for the S/CMS 76 can be returned as part of the profile data for telephone 78.

D) User-Registered Device IDs

Another possible business relationship is one in which user U pre-registers the device id of telephone 78. User U obtains telephone 78 from device provider 70. The device id will be available to user U in a ready manner. It can be printed on telephone 78, on the packaging, on an instruction sheet etc. User U will contact service provider 66 to obtain a service plan. As part of this process, service provider 66 will request the device id and name of device provider 70. Service provider 66 will then contact the device provider 70 to register the device id against the service plan. The registration of telephone 78 can then be performed as described above in the pre-registered device id section. As in the previous examples, the D/CMS 86 can either supply the location of the S/CMS 76 to the device or perform the S/CMS 76 function itself depending on the relationship between device provider 70 and the service provider 66. In the former case, the URI for S/CMS 76 can be returned as part of the device configuration profile data.

E) Service Provider Registered Device IDs

Another alternative business relationship is driven by initial user contact with service provider 66. User U will contact service provider 66 directly to arrange a service plan. Service provider 66 allocates and configures a device id corresponding to user U and telephone 78, and provides this device id to user U for entry at an initial configuration time. The device id can be provided to the user in a number of ways, such as by e-mail, by telephone contact, setter mail, directly due to customer visit, etc. The device id is formatted such that it can uniquely identify service provider 66 to the D/CMS 86. (Note that it is not necessary for device provider 70 to be able to derive the specific service plan and user, only the correct service provider 66). User U can optionally have previously purchased the device from device provider 70, at a retail outlet, or by other means. Or, service provider 66 may arrange to provide telephone 78 to user U, for example by shipping or due to customer visit to a service provider outlet. The service provider 66 will then contact the device provider 70 to register the device id against the service plan, or the device id may be selected from a previously arranged group of ids already enabled for that service provider at the device provider D/CMS. At initial device configuration, user U is asked to enter their device id into a user interface, and it is then used along with the pre-configured location of D/CMS 86 to create a SIP URI to be used in contact with D/CMS 86, which can then be mapped to service provider 66. As in the previous examples, D/CMS 86 can either supply the location of the S/CMS 74 to telephone 78 or perform the S/CMS function itself depending on the relationship between device provider 70 and service provider 66. In the former case, the URI for the S/CMS 76 can be returned as part of the device configuration profile data.

The Device ID may be stored in a non-volatile memory in telephone 78 so that telephone 78 can identify itself automatically for later operations in event of power interruption due to disconnect, power failure, reboot, and so on. User U wilt not be required to remember the Device id.

F) User Service Registration at Device Configuration Time

Another possible method of performing service registration is to request user U to do so at the time of configuration of telephone 78. Depending on the type of telephone 78, there are multiple methods by which interaction with user U can be effected.

As described above, SIP addresses (from STUN server 90 or other NAT traversal process) are exchanged during configuration of telephone 78 to allow for the subscription/notification process. The possession of these addresses can allow interactions with user U to obtain information about the service plan that they have selected or to assist them in selecting a service plan.

For the simplest version of telephone 78, which will lack displays and full keyboard, a voice connection can be set up between telephone 78 the D/CMS 86. Such a voice connection can be effected using standard SIP methods, or similar. Either D/CMS 86 or telephone 78 can be configured to initiate the connection at time of initial configuration contact with the D/CMS 86.

At the time of registration of telephone 78, telephone 78 will ring (or alert in some other way) and when user U answers, he/she will be prompted with questions in a voice dialogue for information required to complete service registration. This dialogue may be with a human service representative, or may be via an automated server for example an interactive voice response ("IVR") system. User U can be prompted to reply either with DTMF or by voice if D/CMS 86 is equipped with an automatic speech recognition device.

For more capable telephones 78 with displays and keyboards, (perhaps even computer 77) the service registration dialogue can be accomplished by the exchange of forms. These can be passed back and forth between telephone 78 and D/CMS 86 for example by use of SIP Message messages in the same manner as an instant messaging exchange, or may be via Web access using hyper text markup language ("HTML"), or other means.

Mixed mode text and voice negotiations are also possible. D/CMS 86 can send lists of options as text to the display of telephone 78 and accept replies in either text or voice. For such a method, both a voice and text connection can be set up between telephone 78 and the D/CMS 86.

For this method, user U can have already registered for a service plan or may request assistance in the selection of a service provider and plan. The dialogue can initially ask user U if they have registered for a plan and if so the service provider identity and a registration number supplied to user U as in the previous method. If user U requests assistance in selecting a plan, the dialogue can provide information on plans from service providers that the device provider 70 has business relationships with. This can be done by D/CMS 86 exclusively or in cooperation by D/CMS 86 and/or other servers supplied by the various service providers. When the service provider and plan have been selected, service configuration can be performed in the manner described in the previous sections. This can be done by D/CMS 86 itself or D/CMS 86 can supply telephone 78 with the location of S/CMS 76 of the selected service provider 66.

Handoff of Configuration Service

In any of the foregoing methods, it is possible for the ongoing maintenance of the profile data for telephone 78 to be provided by service provider 66, rather than being effected by the device provider 70. This is useful to service provider 66 in order to maintain a more complete service. It can also be useful to device provider 70, since it allows for the latest software to be loaded, license checking, inventory management, and other functions, yet it offloads the ongoing maintenance of the actual profile data of telephone 78, which could become very large.

Upon initial connection with D/CMS 86, telephone 78 can be provided with initial configuration corresponding to that specific telephone 78 (e.g. initial/updated software load, device profile containing default key configurations, generic service settings, etc). After all telephone-specific generic configuration has been accomplished (which may take more than one Subscribe/Notify cycle to complete), the current D/CMS 86 can issue a profile updating Notify to telephone 78 which contains the location of a different instance of a D/CMS (not shown) other than D/CMS 86, which may be maintained by the service provider (such as, for example, service provider 66, in a D/CMS that is maintained by service provider 66) or maintained by some other $3^{rd}$ party entity, and may or may not be resident on the same physical server as S/CMS 76. Based on this change, telephone 78 can drop the existing subscription to the current D/CMS 86, and then subscribe to the different instance of the D/CMS. Future Subscribe operations for that profile of telephone 78 could then be directed to the different instance of the D/CMS, based on stored data (e.g. the URI of service provider's D/CMS, which may be same as same as S/CMS 76) held in telephone 78. Should a previously handed-off telephone 78 re-arrive at the original D/CMS 86 for some reason, that telephone 78 would be handed-off again in the same manner.

After handoff and subscription to different instance of the D/CMS, any locally generated changes to the profile data (e.g. user re-programs a key etc) of telephone 78 can then be pushed up to the different instance of the D/CMS by well known means (e.g. via HTTPS or similar), and update the copy of the profile data that is held by different instance of the D/CMS for later retrieval. The different instance of the D/CMS does not need specific awareness of the meaning of this data, since it is specific to telephone 78 and is specified by telephone 78, so the updates can be treated transparently. There may be reasons why the service provider does want to have access to this data and/or be able to apply policy to its use—this is not prohibited, but would require specific handling.

Service Provider Specific Customization

In any of the above methods, since the device id is known to the device provider 70, and can be mapped to the specific service provider 66, device provider 70 can provide content specific to that service provider 66. For example, device provider 70 may maintain different customized software for different service providers other than or including service provider 66, or different profiles for telephone 78 with different default key maps, directory entries, or similar.

Data Exchanges Between Device and Service Providers

The above-described service implies commercial agreements and systems interfacing between device provider 70 and service providers 66. If a device provider 70 directs a device to a service provider 66, device provider 70 may expect to receive consideration, perhaps in the form of payment, be paid for the referral. To receive consideration, a method can effected whereby device provider 70 can identify telephone 78 that has been provided with this service that cannot be repudiated by service provider 66, since device provider 70 and service providers 66 need to exchange information, including the device ids, between their systems. The relationships may be many-to-one (i.e. one device provider 70 can may have arrangements with one or more different service providers 66, and a service provider may also have arrangements with one or more different device providers 66). There are several methods by which the foregoing can be accomplished.

A) For the cases in which device provider 70 operates an CMS (such as D/CMS 86 or even S/CMS 76 itself on behalf of service provider 66, or acts as relay in the interactions between the S/CMS 76 and telephone 78, the negotiation can be set up so that the CMS being operated by device provider 70 can extract a service plan identifier from S/CMS 76. This could be done for example using an HTTPS or similar well known means, with device provider 70 sending the device id of telephone 78 to be mapped to S/CMS 76, with service provider 66 returning the corresponding service instance id for that device and corresponding user service plan and profile data corresponding to user U. Telephone device id and service instance id can be crafted for example with encryption hash or other technology so that they can only have been created by the device provider 70 to service provider 66, respectively. For example, the device id could be a hash of the device MAC Address, and the service id could be a hash of the user's SIP Address of Record ("AOR"). These encrypted ids can act as the non-repudiateable id set for billing purposes.

B) Another case is one in which device provider 70 will expect service provider 66 to supply device provider 70 with the non-repudiateable id. This Is exemplified by the "Service Provider Registered Device IDs" and "User-registered Device IDs" scenarios previously-described. After the configuration process at S/CMS 76, service provider 66 can indicate to device provider 70 that a telephone 78 with a specific device id has been configured and validated. The device id can be formed using the encryption techniques above. The data exchange in this case would be initiated by service provider 66 and can use well known means such as HTTPS, providing the validated device id to D/CMS 86, with D/CMS 86 returning a confirmation id. D/CMS 86 can then permit the specific device id to be configured and come into service as previously-described.

C) As a variation on the above case, service provider 66 can pre-validate a range of device ids that device provider 70 can then allow to be configured and go into service. This could use the same exchange between systems associated with service provider 66 and device provider 70, with the difference that multiple device ids are provided.

D) Another case is one in which service provider 66 can expect device provider 70 to supply service provider 66 with the non-repudiateable id. This is exemplified by the "User Service Registration at Device Configuration Time" scenario described previously. After the configuration process at the D/CMS 86, device provider 70 can indicate to service provider 66 that a telephone 78 with a specific device id has been configured and validated against a particular service id. The device id and service id can be formed using the encryption techniques above. The data exchange in this case would be initiated by device provider 70 and can use well known means such as HTTPS, providing the validated device id and service id to S/CMS 76, with S/CMS 76 returning a confirmation id. Additional information regarding the specific user can also be transferred to service provider 66 at this time, such as the user's SIP AOR, any preferences, and specific service plan selected. D/CMS 86 can then allow the specific device id to be configured, and S/CMS 76 can allow the specific user corresponding to the service id to be configured and come into service as previously described.

E) As a variation on the above case, device provider 70 can pre-validate a range of service ids that service provider 66 can then allow to be configured and go into service. This could use the same exchange between systems respective to device provider 70 and service provider 66, with the difference that multiple service ids are provided.

To enforce the above cases, the entity operating the CMS (either device provider 70 or service provider 66) has the capability of disabling telephones 78 for which that entity has received no proof of valid service-provider and/or device provider configuration, or which otherwise appear to be invalid. The relevant CMS has the capability of updating the configuration of the telephone 78. This is normally done to update profile data, correct device software bugs etc. However, the CMS can issue configuration that will disable the telephone 78, or simply refuse to provide initial software load or any configuration at all. Optionally, depending on the specific inter-provider interactions, a timeout can be set after telephone 78 receives its device configuration. If no non-repudiateable id is received during that timeout, a configuration can be issued to disable the telephone 78.

Use of HTTP

The previous sections have described the registration process as being accomplished with the SIP Subscription/Notification capability. There are multiple advantages to this process Firstly telephone 78 can use SIP as part of its normal function and so will have that capability as a default. Secondly the use of a permanent subscription can allow either D/CMS 86 or S/CMS 76 to update telephone 78 at any time required. There is no need for telephone 78 to poll the relevant CMS (i.e. D/CMS 86 or S/CMS 76). With large numbers of telephones 78 (or computers 77), this could present a significant problem with scalability. Also as indicated above, the SIP process can have difficulty with NAT traversal, HTTP will have no difficulty with NAT traversal. However HTTP does not have a Subscription/Notification possibility. The processes described above are possible using HTTP instead of SIP, if telephone 78 will periodically poll the configuration servers for any required updates. The dialog process described above may be done by HTTP with the exchange of HTML forms and the voice dialog may be accomplished, as one example, by the use of specialized applets or other well known means.

Other protocols beyond SIP or HTTP are also feasible.

Security and Encryption

It is understood that it can be desirable for privacy and security reasons to encrypt the configuration procedures.

Both SIP and HTTP provide well-known mechanisms of encryption for both secrecy and validation for both control and media streams. These well-known mechanisms can be used for this purpose.

While the foregoing provides discussions about certain embodiments, it is to be understood that combinations, variations and/or subsets of those embodiments are contemplated.

It is to be noted that all third party documents referenced herein are hereby incorporated herein by reference.

The invention claimed is:

1. A method for configuring a network telephone device comprising:
   connecting said device to a network;
   accessing within said device a pre-defined address of a first configuration server located on said network, said first configuration server operated by a provider of said device;
   sending a configuration request for a telephony service; said configuration request sent from said device to said first configuration server; said configuration request including a device identifier unique to said device within said network, and a plurality of telephony service options, said options include at least one of a selection of a service provider from a plurality of service providers and a telephone calling plan;
   receiving said configuration request at said first configuration server and upon request from said device, said first configuration server providing information on said plan from said plurality of service providers to said device;
   preparing a configuration profile for said device at said first configuration server and a second configuration server in communication with said first configuration server, said second configuration server operated by a provider of said service, whereby the providers of said device and said service are independent; said configuration profile contains a service address for the device and an address on said network for the service provider that will provide said telephony service; and
   sending said profile to said device from either of said first or second configuration servers.

2. The method of claim 1 including a plurality of configuration servers and wherein a portion of said configuration profile is prepared by one of said configuration servers and a remainder of said configuration profile is prepared by another one of said configuration servers.

3. The method of claim 2 wherein said configuration servers manage a billing system that cooperates to generate service invoices for service accessed by said device through said service provider.

4. The method of claim 3 wherein said billing system is based on a unique device identifier.

5. The method of claim 4 wherein exchanged unique ids are encrypted for purpose of non-repudiation.

6. The method of claim 3 wherein said billing system is based on said configuration server operated by said device provider receiving a unique device identifier from said configuration server operated by said service provider.

7. The method of claim 3 wherein communications between said configuration servers is encrypted.

8. The method of claim 2 wherein communications between said configuration servers is encrypted.

9. The method of claim 1 wherein, said configuration server presents a plurality of options in a service plan at said device for selection by a user and receives a selection of said options, and wherein said configuration server prepares said configuration profile based on said selection of options.

10. The method of claim 9 wherein said plurality of options are presented via a voice dialogue.

11. The method of claim 9 wherein said plurality of options are presented via form text.

12. The method of claim 9 wherein said plurality of options are presented via a combination of voice and text form dialogue.

13. The method of claim 1 wherein said network is part of an enterprise network and said service is one of a communication service and a device configuration service; said service being provided by said service provider.

14. The method of claim 13 wherein said device identifier is pre-registered and one of a block of unique device identifiers supplied to a plurality of said devices such that when said configuration request is received, said first configuration server recognizes said device identifier.

15. The method of claim 13 wherein a user enters said device identifier as part of said sending said configuration request.

16. The method of claim 1 wherein said device communicates with said service via the Session Initiation Protocol ("SIP").

17. The method of claim 16 wherein said device identifier is a uniform resource identifier ("URI").

18. The method of claim 1 wherein further comprising modifying said configuration profile to specify a different service provider from said service provider such that provision of said service is handed-off from said service provider to said different service provider.

19. The method of claim 18 wherein part of said configuration profile as modified contains a new configuration server address of a new configuration server; and wherein upon receipt of said new configuration server address said device subscribes to said new configuration server.

20. The method of claim 1 wherein said network is the Internet.

21. The method of claim 1 wherein said configuration server is operably associated with a STUN server.

22. The method of claim 1 wherein said network is a combination of a small business network and a wide area network.

23. The method of claim 1 wherein said network is a combination of a home network and a wide area network.

24. The method of claim 1 wherein said network is situated within an enterprise office and said service provider is operated as part of the enterprise.

25. The method of claim 1 wherein said device identifier is a MAC address.

26. The method of claim 1 wherein said device identifier is pre-registered with said first configuration server prior to performance of said method such that when said configuration request is received, said first configuration server recognizes said device identifier.

27. The method of claim 1 wherein said configuration request includes a device identifier unique to said device that is sent from said service provider to said configuration server.

28. The method of claim 1 wherein said configuration profile includes customization of software for said device that is unique to said service provider.

29. The method of claim 1 wherein said device communicates with said service via the Hyper Text Transfer Protocol (HTTP).

30. The method of claim 1 wherein said configuration profile includes customization of configuration data specific to said service provider.

31. The method of claim 1 wherein said configuration profile includes customization of a service plan.

32. The method of claim 1 wherein said network is an enterprise operated WAN.

33. A method for providing configuration information to a telephone device attached to a network comprising:

sending a request for configuration information from said device to at least one of a first network configuration server and a second network configuration server; said request including a device identifier unique to said device within said network and a plurality of service options, wherein said service options include at least one of a selection of a service provider from a plurality of service providers and a telephone calling plan;

receiving a first portion of said configuration information at said device from said first network configuration server, and upon request from said device, said first network configuration server providing information on said plan from said plurality of service providers to said device;

receiving a second portion of said configuration information at said device from said second network configuration server; and, wherein the providers of said first and second network configuration servers are independent different entities and said first and second servers are in communication with each other and a network address of said second server is supplied to said device by said first server.

34. The method of claim 33 in which the first server will identify the second server by submitting a query addressed to a user situated at the device.

35. The method of claim 34 in which the query is verbal.

36. The method of claim 34 in which the query is in text.

37. The method of claim 34 in which the query is a combination of voice and text.

38. The method of claim 34 in which a response to said query is submitted by said user using dual tone multifrequency signals.

39. The method of claim 33 wherein one of said network configuration servers can register a unique identifier associated with said device.

40. The method of claim 39 in which the unique device identifier is the MAC address.

41. The method of claim 39 in which the unique device identifier is supplied by the owner of the second server.

42. The method of claim 33 in which the second server will supply the first server with an indication of said second server's actions when said device is referred to said second server.

43. The method of claim 42 in which the indication is non-repudiateable.

44. The method of claim 33 wherein said second network configuration server is selected from one of a plurality of additional network configuration servers.

45. The method of claim 33 wherein a data structure associates said unique identifier to a block of unique identifiers; said block being associated with said network address.

46. The method of claim 33 wherein said data structure associates said unique identifier directly to said network address.

47. The method of claim 33 in which the first server will act as a relay between the device and the second server.

48. The method of claim 33 in which the device contacts the second server directly for its portion of said configuration information.

49. The method of claim 33 in which the first server will assume the functions of the second server in supplying the configuration to the device.

50. The method of claim 33 wherein said device is operated by a teleworker.

* * * * *